Jan. 12, 1932.  W. ROSS  1,840,917
DEVICE FOR CONTROLLING MATERIALS
Filed Aug. 7, 1929   3 Sheets-Sheet 1
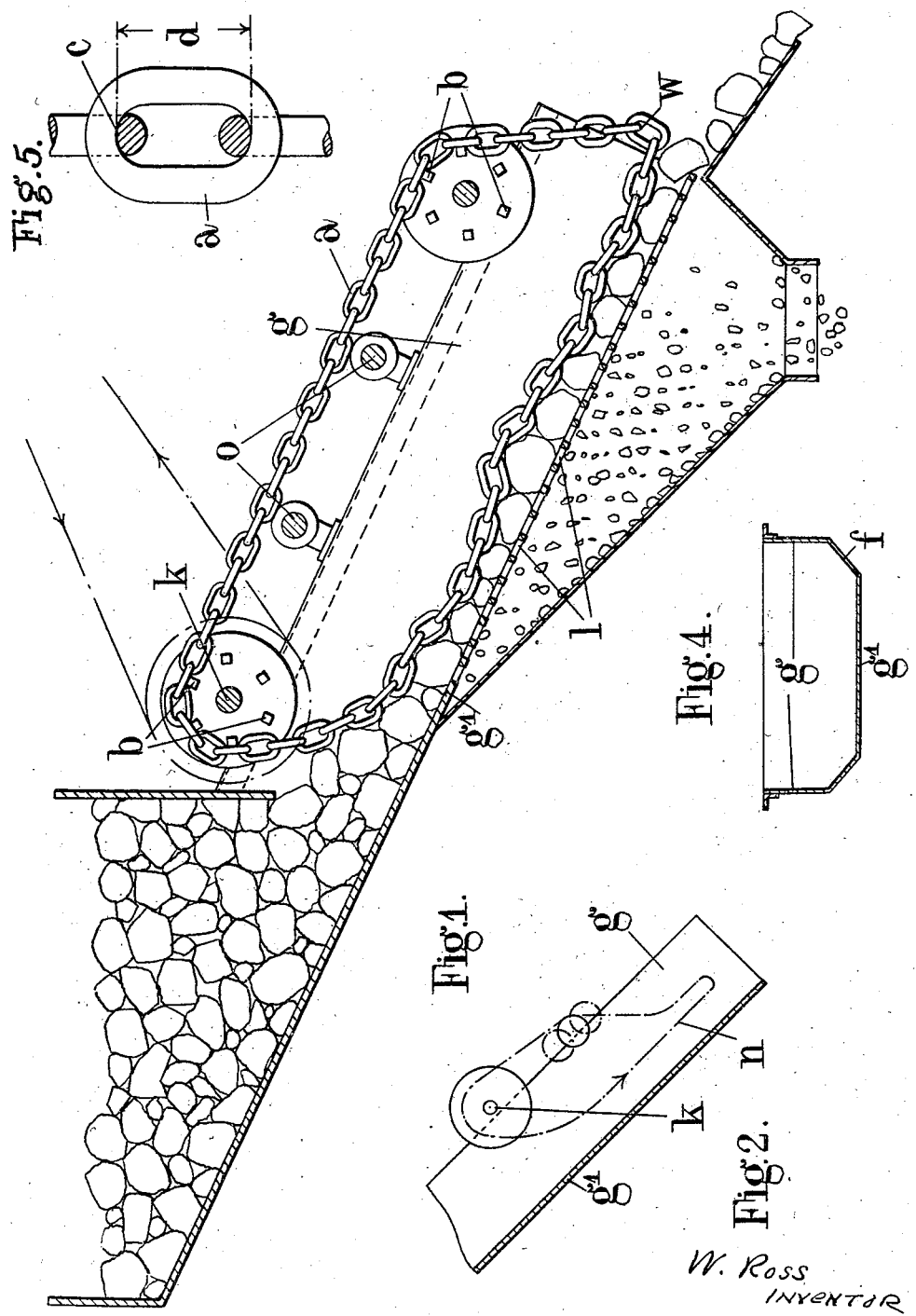

Jan. 12, 1932. W. ROSS 1,840,917
DEVICE FOR CONTROLLING MATERIALS
Filed Aug. 7, 1929 3 Sheets-Sheet 2
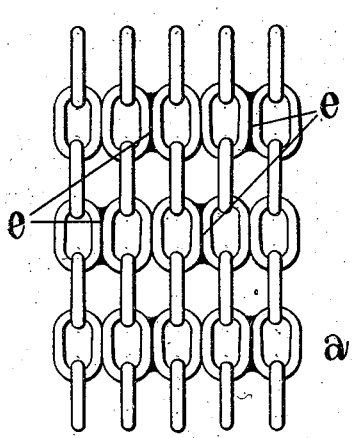
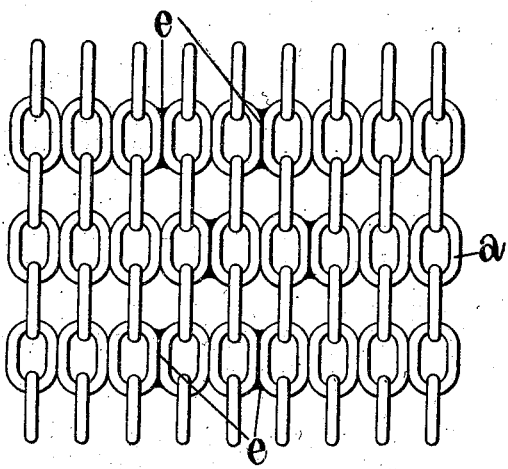
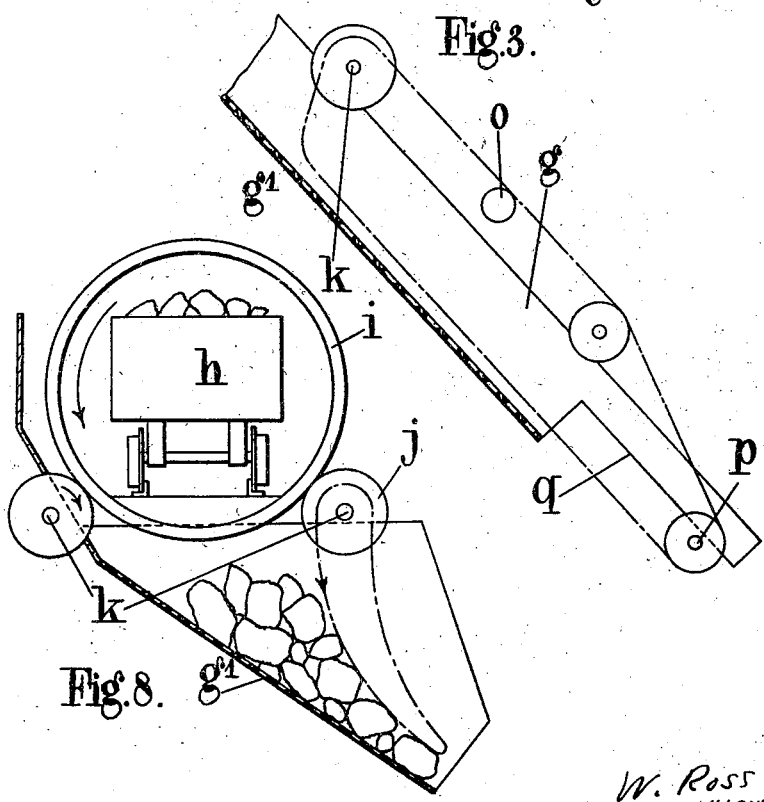
W. ROSS
INVENTOR
By: (signature)
Att'ys.

Jan. 12, 1932.    W. ROSS    1,840,917
DEVICE FOR CONTROLLING MATERIALS
Filed Aug. 7, 1929    3 Sheets-Sheet 3

W. Ross
INVENTOR

Patented Jan. 12, 1932

1,840,917

UNITED STATES PATENT OFFICE

WILLIAM ROSS, OF SURBITON, ENGLAND

DEVICE FOR CONTROLLING MATERIALS

Application filed August 7, 1929, Serial No. 384,119, and in Great Britain July 30, 1929.

This invention relates to the controlling of granular materials such as coke, coal, stone, sand, ore or other granular or pulverulent or like material also such materials as wood chips, whether the same be free running or reluctant or sticky and whether the material is to be delivered from storage bins or other receptacles or whether the devices are to be employed for accelerating, retarding or stopping the flow of materials already in motion. Such materials may be free falling or wholly or partially supported by a chute, conveyor, screen or the like.

So far as relates to the natural flow of materials from the opening of storage bins and the like it will be clear that such flow will vary according to whether the material is small or large or whether it is mixed and varying in size and also with the shape of the material and upon its running qualities.

So far as relates to the natural flow and behaviour of material when it is dumped in batches from a wagon, grab or the like into a crusher, wagon or the like or on to a conveyor, screen or the like, it will be clear that the loading of the crusher, conveyor or screen will be uneven, also that the material will be subject to breakage or degradation when brought suddenly to rest at its destination and that the impacting material will cause injury and wear to such destination.

So far as relates to materials already in motion in or on a chute, screen or conveyor it will be clear that the speed of flow of any given material will be subject to many vagaries according to whether the supporting means be rough or smooth, steeply inclined or not steeply inclined or not inclined at all, and according to the condition of the material itself which may be affected in a variety of ways by atmospheric conditions and in other ways.

High velocity in a chute may mean undue wear and undue breakage of material and undue injury to the destination. Slow speed may mean flooding over. Material on a screen may flow too fast for efficient screening; it may flow too slow and become too thick for efficient screening or small pieces of material may plug the screen apertures and both slow up or stop the general flow and prevent efficient screening. Relative speed of travel of a piece of material and a conveyor may abrade the conveyor.

The object of the present invention is to provide a simple, economical and efficient form of control device which will give proper control of materials under all the above conditions or other conditions that may be met with in practice, at the same time providing for any necessary adjustments and indicators that may be required to suit varying changes in the material or to suit tonnage changes that may be required.

The invention consists in the various details and combination of features as hereinafter described and referred to in the appendant claims.

In the accompanying drawings:—

Figure 1 is a sectional elevation illustrating one form of the invention;

Figures 2 and 3 are diagrammatic views illustrating modified forms and arrangements of my feeding or controlling device;

Figure 4 is a sectional elevation illustrating one form of chute according to my invention;

Figure 5 is a sectional elevation of a portion of a chain employed in accordance with my invention;

Figures 6 and 7 are plan views illustrating two forms of flexible member employed in accordance with my invention;

Figure 8 is an elevation illustrating another form of my invention;

Figure 9:
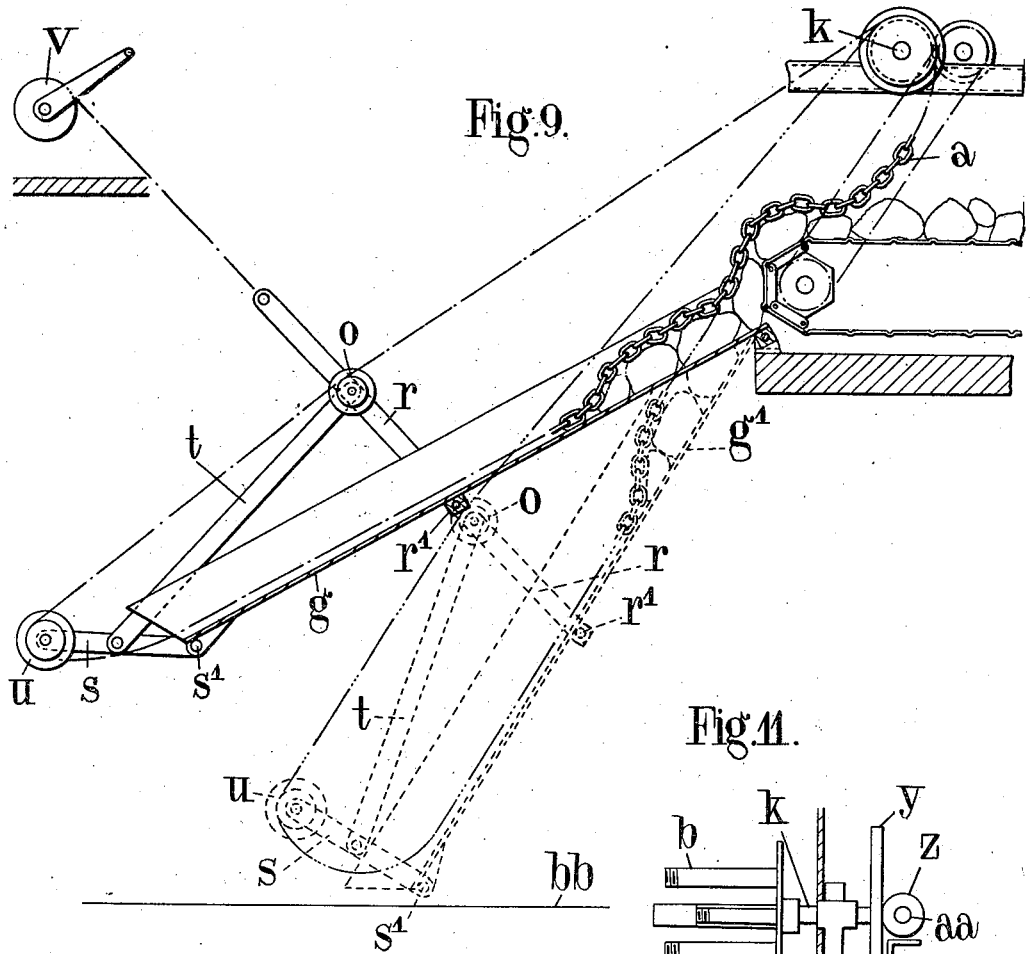
Figure 9 is a sectional elevation illustrating a further form of my invention.

Referring to the drawings the device is shown as consisting of chains $a$ the links of which engage with bars $b$ or other means by which the chains may be moved for the purpose of controlling the flow of material.

I prefer to use chains having a shape as shown at $c$ in Figure 5 at the point of contact of the adjacent links because such chains have a larger bearing surface at their point of contact and particularly in order that I may make use of chains which have become useless for their original purpose on account of their reduced strength and their lengthened pitch $d$ as, for example, old ship anchor chains, mooring chains and crane chains. Furthermore, by the provision of a plurality of flexible chains illustrated in Figures 1, 6 and 7 as my feeding element, the latter is provided with an uneven surface to grip the material on its upper or exposed surface as is essential for the efficient and successful operation of my device.

In many cases I prefer to join or link together the chain orbits at intervals, as at $e$ (Figures 6 and 7), sometimes joining all the chains into a single flexible curtain as illustrated in Figure 6 or I may join only the central chains together and leave the outer chains in single loops as indicated in Figure 7. The chains would be joined together when:

(a) It is desirable to increase the resisting power of a given total weight of chains to the impact of large material or the impact of batches of material;

(b) When it is desirable to keep the material from getting inside the orbit and into contact with the returning chains;

(c) When the individual chains would stick into the apertures of the screen over which the material may be travelling;

(d) When it is desired to provide a more efficient means of removing pieces of material which have become stuck in the screen apertures, and (e) When it is desired to apply pressure on top of the material to assist it to pass through the screen apertures.

The chains would be joined together into two or more curtains when a single curtain would be too heavy to handle into or out of place and where it is desired to drive each curtain separately in order to adjust the relative amounts of material delivered from various parts of the width. It is desirable that the chains be joined together exclusive of the side chains because the side chains are thus more easily able to adjust themselves to sideways fluctuations caused by the material or by the chute corners or sides, especially when the chains were hanging naturally are wider than the containing chute sides, as when a tapering chute is employed.

The chains are preferably joined together by welding as, for example, at the points $e$ Figures 6 and 7.

The apron of chains, or aprons when a plurality of such are used, and of course the individual chains, may be turned inside out in order to bring the inner surfaces of the chains into contact with the material and also with the drum bars when the original bearing surfaces are worn.

In order to minimize the chances of material getting inside the orbit I may arrange the chute bottom or screen with bevelled corners $f$, as illustrated in Figure 4, whereby the material is kept away from the sides $g$ of the chute.

The chains forming the feeding or controlling element of the present invention may be made of varying lengths. This is desirable when the chute is heavily tapered in which case the chains conform more efficiently to the shape of the chute and because chains of equal length articulate in unison and tend to produce a spasmodic or pulsating delivery of the material.

When the material is discharged against the chains from a wagon by means of a tippler I may embody such tippler and its operative means with my feeding device.

Referring to Figure 8 there is shown a wagon $h$ from which the material is adapted to be discharged by means of a tippler $i$ and one set $j$ of the tippler rolls is carried on the main shaft $k$ of my device.

When the material is required to be received by my device and delivered in more than one size I may arrange the chute or trough bottom $g'$ with holes or apertures $l$ or I may provide a wire mesh bottom or one comprising cross bars or roller shafts or roller shafts and discs either stationary or driven as through the agency of my device or by independent means. Such screening means may be arranged with differently graduated holes or apertures and I may blank off part of the apertured surface of the chute to alter the range of separated sizes.

In some cases it may be desirable to adjust or vary the amount or weight of chain in contact with the material and one convenient arrangement for providing for this is shown in Figure 2 and comprises an idler $m$ which may be adjusted into any required position as shown and so shorten or lengthen the portion $n$ of the chain in contact with the material.

It may be desirable, especially when the material is to flow at a flat angle and along any considerable length, to support the return or upper side of the orbit at one or more points such as is illutrated, for example, at $o$ in Figures 1 and 3.

Figure 3 illustrates a further modification of my invention according to which an idler or drum $p$ is provided at the point of return of the chain or feeder element. The sides of the chute in this construction are shown with cut-away portions $q$. When pivoted chutes, such as shown in Figure 3, are employed for loading friable material into wagons it is necessary to provide for altering the position of the idler because it is essential that the chute in the lowest position should reach close to the wagon bottom. Provision for this movement of the idler is shown in Figure 9 in which a lever system is provided comprising levers $r$, $s$, pivoted at $r'$, $s'$ respectively and connected together by means of a link $t$, the arrangement being such that the idler $u$ is moved to the dotted position where it clears the bottom $b\,b$ of the waggon when the chute is lowered and is moved outwardly to the position shown in full lines in this figure when the chute is raised and so provide an increasing amount of drag as the chute is raised to flatter angles. The chute may be raised and lowered by means of a winch $v$ or other suitable means.

It will be seen upon reference to Figure 1 that one side only of each second link bears on the drum bars $b$ and one edge only of each second link bears on the material and takes most of the wear. It is obviously desirable to spread the wear equally over all the links of the chains. I obtain this object by forming the feed device with a number of separate loops of chain in each of which I arrange an odd number of links so that a half twist is put in the loop of chain whereby both sides and both edges of every link are brought into action to bear on the drum bars and material respectively. The twist of the chain causes the chain to rotate on its axis one half revolution for each turn of the chain loop. The one half revolution takes place at the lower end $w$ of the loop and serves to stir or steer the material sideways besides moving it downwards. This action is particularly useful to stir sticky material in order to screen it and also to clear pieces of small material out of the holes or apertures $l$.

Figure 10:
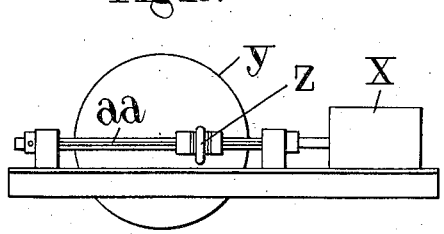
Figures 10 and 11 are side and front views respectively of a still further form of my invention employing a counter device.
Figure 11:
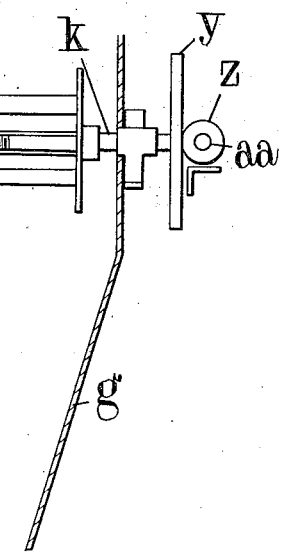

In order to obtain a record of the material delivered by my device (as when the device is used to feed coal to boilers or locomotives) I may provide a counter in conjunction with my device as indicated at $x$ in Figure 10. The counter device comprises a disc $y$ or the like mounted on the rotary shaft $k$ of my device and communicates a rotary motion to a wheel $z$, the speed of the latter being adjusted by sliding the disc along shaft $a\,a$. The position of disc $z$ can be set by trial so that the counter gives a given reading per revolution of shaft $k$.

I claim:

1. Mechanism for controlling the flow of granular or pulverulent or like material comprising a plurality of endless chains united together side by side to form a mat flexible both longitudinally and transversely, means for moving said flexible mat in contact with the material to be controlled, a chute upon which the material is supported and along which it is fed by the flexible mat and means for varying the position of the flexible member in relation to the discharge end of the said chute said flexible mat being arranged to bear upon the material on the chute for a substantial portion of its under surface so as to drag upon the material and so control and feed same.

2. Mechanism according to claim 1 comprising, in addition to a flexible mat formed from a plurality of endless chains united together, a plurality of separated endless chains, said separated endless chains being disposed on either side of the flexible mat.

3. Mechanism according to claim 1 wherein the chain links of said flexible mat have flattened contact surfaces.

In testimony whereof I have signed my name to this specification.

WILLIAM ROSS.